United States Patent
Kirkwood

[15] 3,692,056
[45] Sept. 19, 1972

[54] MULTI-PORT VALVE HAVING IMPROVED SEAL RETAINING MEANS

[72] Inventor: Creal E. Kirkwood, 3237 North Lewis, Tulsa, Okla. 74110

[22] Filed: Aug. 25, 1971

[21] Appl. No.: 174,628

Related U.S. Application Data

[63] Continuation-in-part of Ser. No. 63,236, Aug. 12, 1970, Pat. No. 3,658,093.

[52] U.S. Cl. ............................ 137/625.43, 251/175
[51] Int. Cl. ........................................... F16k 11/07
[58] Field of Search .137/625.43; 251/159, 171, 172, 251/175

[56] References Cited

UNITED STATES PATENTS

| | | | |
|---|---|---|---|
| 1,813,126 | 7/1931 | Sheppard | 251/173 |
| 1,834,988 | 12/1931 | White | 251/173 |
| 3,269,414 | 8/1966 | Mayo | 137/625.43 X |

Primary Examiner—Harold W. Weakley
Attorney—James R. Head et al.

[57] ABSTRACT

A valve having an internal cylindrical sealing surface and a plurality of spaced apart port openings, a gate member positioned in the body dividing it into two flow chambers, the gate member having opposed longitudinal sides and semicircular portions providing a continuous sealing surface, the gate member having spaced apart continuous grooves formed in the sealing surface, a continuous gasket member supported in each of the gate member grooves providing, when the gasket members are expanded by pressure applied externally of the valve, sealing engagement with the valve sealing surface, and an elongated gasket retaining plate affixed to each longitudinal side of the gate member, each gasket retaining plate being configured to form a portion of a groove in the gate member, the width of each groove being narrower at the contact surface than the diameter of the gasket member to prevent the gasket member from being dislodged.

4 Claims, 5 Drawing Figures

INVENTOR
CREAL E. KIRKWOOD
BY
Head & Johnson
ATTORNEYS

INVENTOR.
CREAL E. KIRKWOOD
BY
Head & Johnson
ATTORNEYS 3,692,056

MULTI-PORT VALVE HAVING IMPROVED SEAL RETAINING MEANS

CROSS REFERENCE

This is a continuation-in-part of copending application No. 63,236 entitled "Valve Having Expandable Sealing Means" filed Aug. 12, 1970, now U.S. Pat. No. 3,658,093.

BACKGROUND, SUMMARY AND OBJECTS OF THE INVENTION

U.S. Pat. No. 3,191,628, issued June 29, 1965, and entitled "Multi-Port Valve" discloses a valve having a plurality of ports intersecting a valve body including an internal circumferential sealing surface and a gate member rotatably mounted in the valve body for sealably dividing the internal sealing surfaces into two flow passageways. Copending application Ser. No. 63,236 discloses an improvement in the concept of the issued U.S. Pat. No. 3,191,628, the improvement consisting essentially of means of employing expandable seals in the valve, including an arrangement for utilizing a single length of tubing to provide parallel expandable seal members engageable around the total interior periphery of the body sealing surface. The present invention is directed towards an improvement in the subject matter of U.S. Pat. application Ser. No. 63,236 and is particularly directed towards improved means of retaining the gasket members wherein grooves in the gate member and discloses the use of separate integral expandable seal members.

Still more particularly, an object of this invention is to provide a multi-port valve having a gate member therein with parallel grooves in the gate member sealing surface into which are positioned expandable seals, including improved means for retaining the seals in the grooves in the gate member.

These objects, as well as others, will be fulfilled in the embodiment of the invention now to be described, the exemplary embodiment being illustrated in the attached drawings.

DESCRIPTION OF THE VIEWS

DETAILED DESCRIPTION

Figure 1:
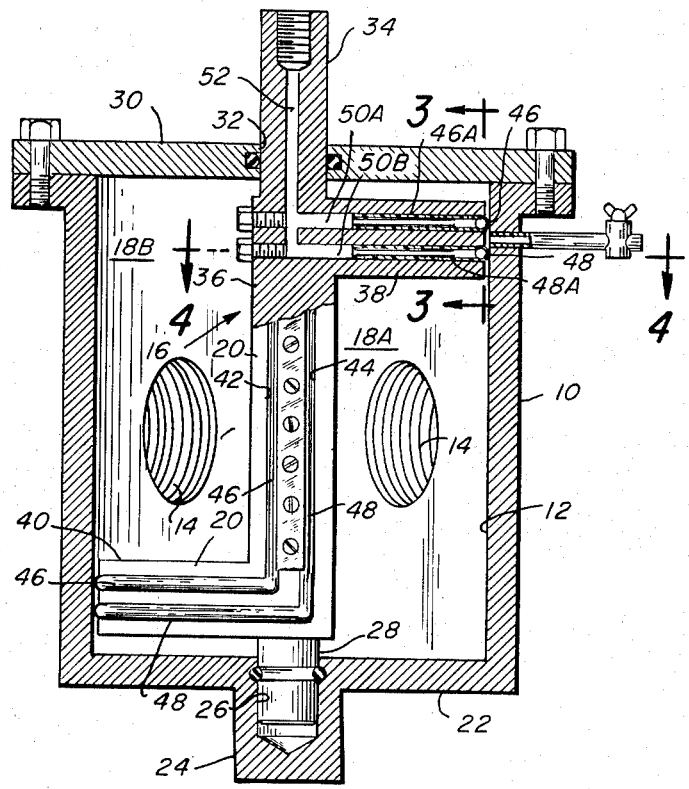
FIG. 1 is a cross-sectional view of a multi-port valve embodying this invention.

Referring now to the drawings and first to FIG. 1, a cross-sectional view of a valve embodying the principles of this invention is illustrated. The valve includes a body 10 having a circumferential internal sealing surface 12. Intersecting the valve body 10 and sealing surface 12 is a plurality of ports 14, only two of which are seen in FIG. 1. Rotatably positioned in body 10 is a gate member, generally indicated by the numeral 16, which divides the interior of body 10 into the two flow passageways 18A and 18B. Gate member 16 includes a sealing surface 20 adjacent to the body sealing surface 12. The gate member sealing surface 20 extends adjacent the full interior periphery of body sealing surface 12.

Body 10 has a closed lower end 20 with a boss portion 24 having an axial recess 26 therein which rotatably receives a downward axially extending lower gate trunnion 28. The upper end of body 10 is closed by means of a plate 30 having an opening 32 therein receiving shaft 34 extending from the gate member. Trunnion 28 and shaft 34 are coaxial and axially rotatably support the gate member 16 within the body sealing surface 12.

Figure 2:
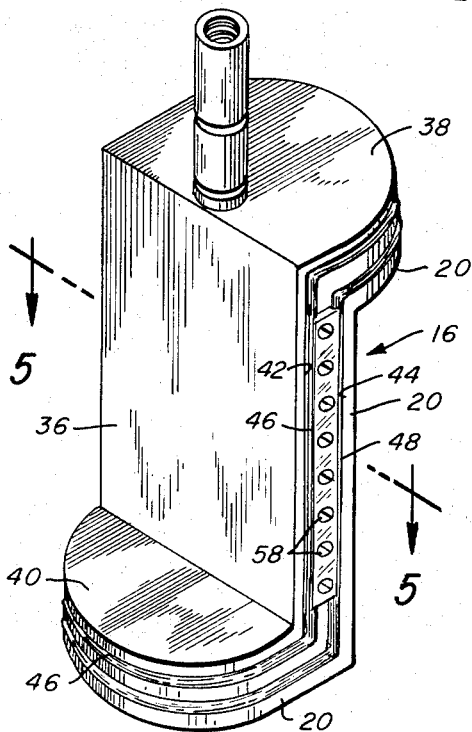
FIG. 2 is an isometric view of the gate member as utilized in the valve of FIG. 1.
Figure 3:
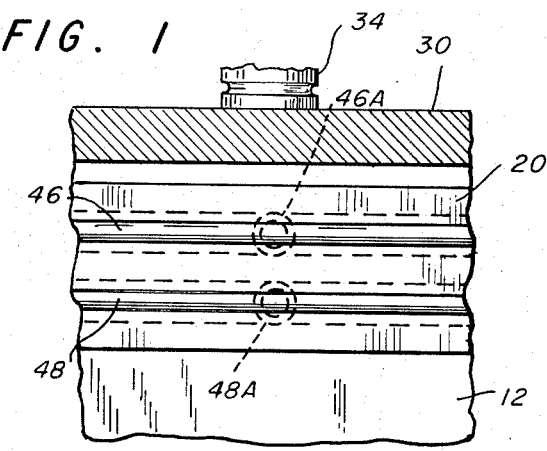
FIG. 3 is a partial cross-sectional view taken along the lines 3—3 of FIG. 1.

The gate member 16, best shown in FIG. 2, includes a parallel sided main portion 36, a first semicircular wing portion 38 at the upper end of the main portion 36, and a second semicircular wing portion 40 at the lower end of the main portion. The wing portions 38 and 40 extend perpendicular the main portion 36, are parallel to each other, and extend in opposite directions from the main portion 36. The parallel sides of the main portion 36 and the semicircular peripheries of the first and second wing portions 38 and 40 form the continuous gate sealing surface 20 which is in close proximity with the cylindrical sealing surface 12 of the body. Formed in the gate sealing surface 20 is a first groove 42 and spaced from and parallel to it, a second groove 44. Groove 42 has positioned in it an expandable tubular gasket member 46 and in like manner groove 44 has positioned in it an expandable tubular gasket 48. Gaskets 46 and 48 may be formed of one continuous length of tubular material as shown in copending U.S. application Ser. No. 63,236. In the illustrated arrangement gaskets 46 and 48 are individual integral gaskets of the type illustrated in my copending patent application "AN EXPANDABLE SEAL FOR VALVES" filed simultaneously with the filing of this disclosure. Each such gasket 48 includes an integral leader portion 46A and 48A, respectively. (See FIG. 1) Formed in the upper semicircular wing portion 38 are spaced ports 50A and 50B which receive gasket leader portion 46A and 46B. Ports 50A and 50B communicate with an axial passage 52 in the shaft 34 providing means by which hydraulic pressure from a source exterior of body 10 may be applied to the interior of gaskets 46 and 48. The gasket leader portions 46A and 48A are sealed in passageways 50A and 50B, such as by means of epoxy cement, so that fluid pressure applied by way of passage 52 is applied to the interior of the gaskets.

Grooves 42 and 48 are preferably formed so that in cross section they are circular and of depth greater than the radius of the normal diameter of the tubular gaskets 46 and 48. In other words, grooves 42 and 46 preferably have a width at the sealing surface 20 less and the maximum width of the groove. This configuration is desirable so as to more effectively retain the gaskets 46 and 48 in the grooves. This preferred configuration of the grooves is particularly important in the areas wherein the gaskets 46 and 48 are positioned in the sides of the main portion 36 of the gate member. It can be seen that the portions of the gaskets received in the grooves in the wing portion 38 and 40 are always immediately adjacent the body sealing surface 12 regardless of the position of the gate member. The same is not true, however, of the portions of the gaskets positioned in the grooves in the sealing surfaces of the gate member main portion 36. As the gate member is rotated, the sides of the main portion 36 pass over ports 14 at which time there is no immediately adjacent body sealing surface to insure that the gaskets will remain positioned in the grooves in the gate member. When high fluid flow rates and high fluid pressure, especially suddenly changing pressures are encountered, there can at times be great forces applied tending to dislodge gaskets 46 and 48 from grooves 42 and 44.

Figure 5:
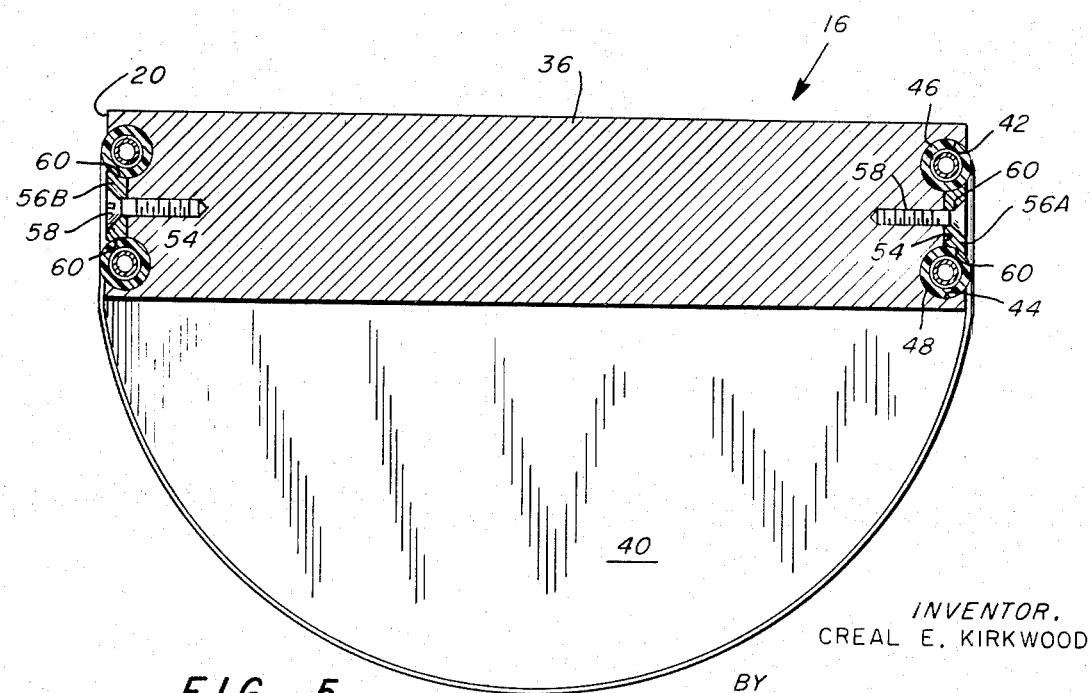
FIG. 5 is a cross-sectional view of the valve gate member taken along the line 5—5 of FIG. 2.

An important element of this invention is the provision of an improved means of retaining the expandable gaskets 46 and 48 in the grooves in the parallel sides of the gate member main portion 36. This is best illustrated in FIGS. 2 and 5. A longitudinal recess 54 is milled between grooves 42 and 44 in the main portion parallel sides. Positioned in recess 54 are first and second elongated gasket retaining plates 56A and 56B. Gasket retaining plates 56A and 56B are held in position, such as by means of screws 58. Each longitudinal edge of each of the gasket retaining plates 56A and 56B is configured at 60 to form a portion of circular cross-sectioned grooves 44 and 42 so that the width of the groove is narrower at the contact surface to thereby prevent the gaskets 46 and 48 from being dislodged.

In the assembly of the gaskets in the grooves of the gate member the gasket retaining plates 56A and 56B are removed prior to the placement of the gaskets in the grooves. After the gaskets are in the grooves 56A and 56B are fastened in position in the configuration of recesses 54 to securely retain the gaskets in position. The configuration of the grooves formed in the sealing surface 20 in the gate member wing portions 38 and 40 and above and below the gasket retaining plates is not required to be so narrowly restrictive, thus the gaskets may be installed in these portions of the grooves by manually squeezing them into position without necessity of any removable portion. Such fitting arrangement is satisfactory in all portions of the gate except those which will be exposed to ports 14. In this area, as previously indicated, the gaskets are placed in position by first removing retaining plates 56A and 56B, inserting the gaskets, and then fastening the plates into position.

In order to more securely retain the gaskets in position, a coil resilient spring 62 (see FIG. 4) may be placed in the gaskets. Spring 62 prevents the collapse of the gaskets while nevertheless preserves flexibility for insertion in the grooves.

Figure 4:
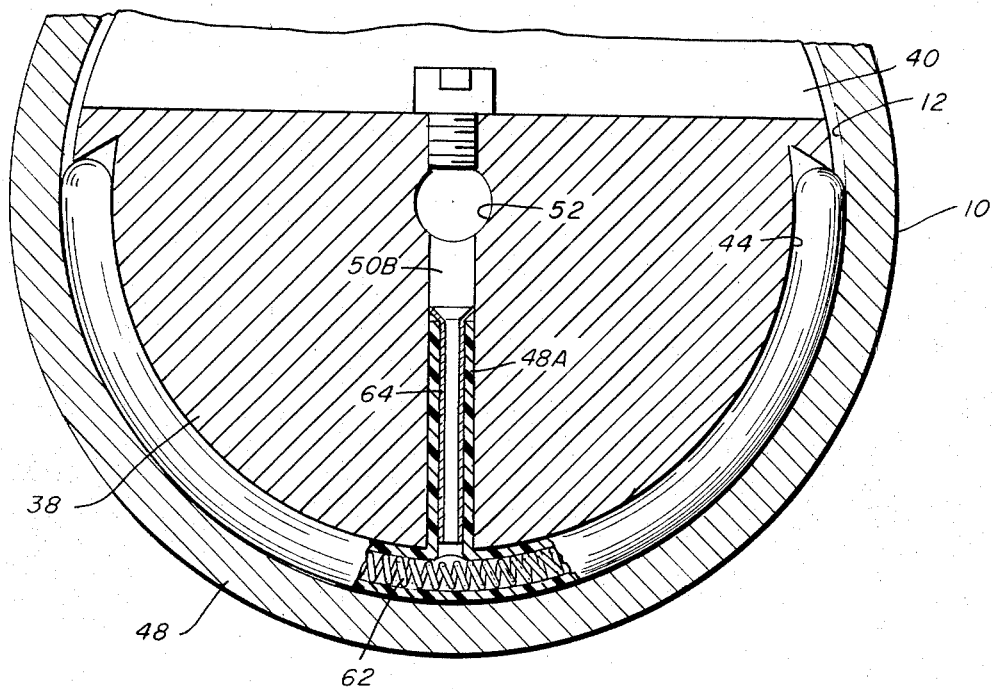
FIG. 4 is a cross-sectional view taken along the line 4—4 of FIG. 1.

FIG. 4 illustrates another element which may be employed to improve the effectiveness of the valve of this invention. A tubular metallic insert 64 of an exterior diameter equal to the interior diameter of gasket leader portion 48 is inserted into the leader portion in passageway 50B. The same, although not shown may equally well be employed in the leader inserted in passageway 50A. The reinforcing tube 64 insures the free flow of fluid into and out of the gaskets.

The operation of the valve of this invention is the same as that in copending U.S. application Ser. No. 63,236. When the valve is in use, hydraulic pressure is applied to expand gaskets 46 and 48 against the body sealing surface 12 to thereby prevent fluid flow from occurring between one flow passageway 18A and the other flow passageway 18B. When it is desired to move the gate member 16 from one position to another, hydraulic pressure on the gaskets is removed, allowing them to collapse at least to the extent that no force is applied against the body sealing surface 12. Gate member 16 may then be freely rotated to the newly desired position at which time hydraulic pressure may be reapplied to the gaskets to seal them with the body sealing surface. Thus, the valve permits an arrangement wherein positive sealing of the gate member to the body may be achieved while nevertheless the gate member may be easily and freely rotated from one position to another when desired.

While this invention has been described with a certain degree of particularity, it is manifest that many changes may be made in the details of construction and the arrangement of components without departing from the spirit and scope of this disclosure. It is understood that this invention is not limited to the embodiments set forth herein for purposes of exemplification, but is to be limited only by the scope of the attached claim or claims, including the full range of equivalency to which each element thereof is entitled.

What is claimed:

1. A valve comprising:
    a tubular body closed at each end and having an internal cylindrical sealing surface and a plurality of spaced apart port openings in the tubular wall thereof;
    a gate member positioned in the tubular body, the gate member being defined by a parallel sided main portion, the sides thereof paralleling the tubular axis of the body, a first semi-circular wing portion at one end of the main portion in a place perpendicular to the plane of the main portion and a second semicircular wing portion at the opposite end of the main portion in a plane perpendicular to the plane of the main portion, the second wing portion extending in a direction opposite the first wing portion, the parallel sides of the main portion and the circular periphery of the first and second wing portions forming a continuous gate sealing surface in close proximity with the cylindrical sealing surface of the tubular body, the gate member dividing the body into separate flow chambers, the gate member including first and second spaced apart continuous grooves formed in the gate sealing surface;
    means of axially and rotatably supporting the gate member in the body member;
    a continuous gasket member supported in each of the grooves in the gate member, the gasket members providing sealing contact between the gate sealing surface and the cylindrical sealing surface of the tubular body member; and
    an elongated gasket retaining plate affixed to each of said parallel sides of said gate member main portion between said grooves, each retaining plate being configured such that each longitudinal edge forms a portion of the said grooves in the parallel sides of said gate member main portion whereby the width of said grooves is narrower at the contact surface to thereby prevent said gaskets from being dislodged from said grooves.

2. A valve according to claim 1 wherein each of said gasket members is tubular and expandable by internal pressure.

3. A valve according to claim 2 including a coiled spring positioned within at least a portion of said tubular gasket members.

4. A valve according to claim 1 wherein each said parallel side of said gate member main portion has an elongated recess therein between said grooves, each of said gasket retaining plates being received in a said recess whereby the outer surface of each of said gasket retaining plate forms a portion of said continuous gate sealing surface.

* * * * *